United States Patent Office 2,923,749
Patented Feb. 2, 1960

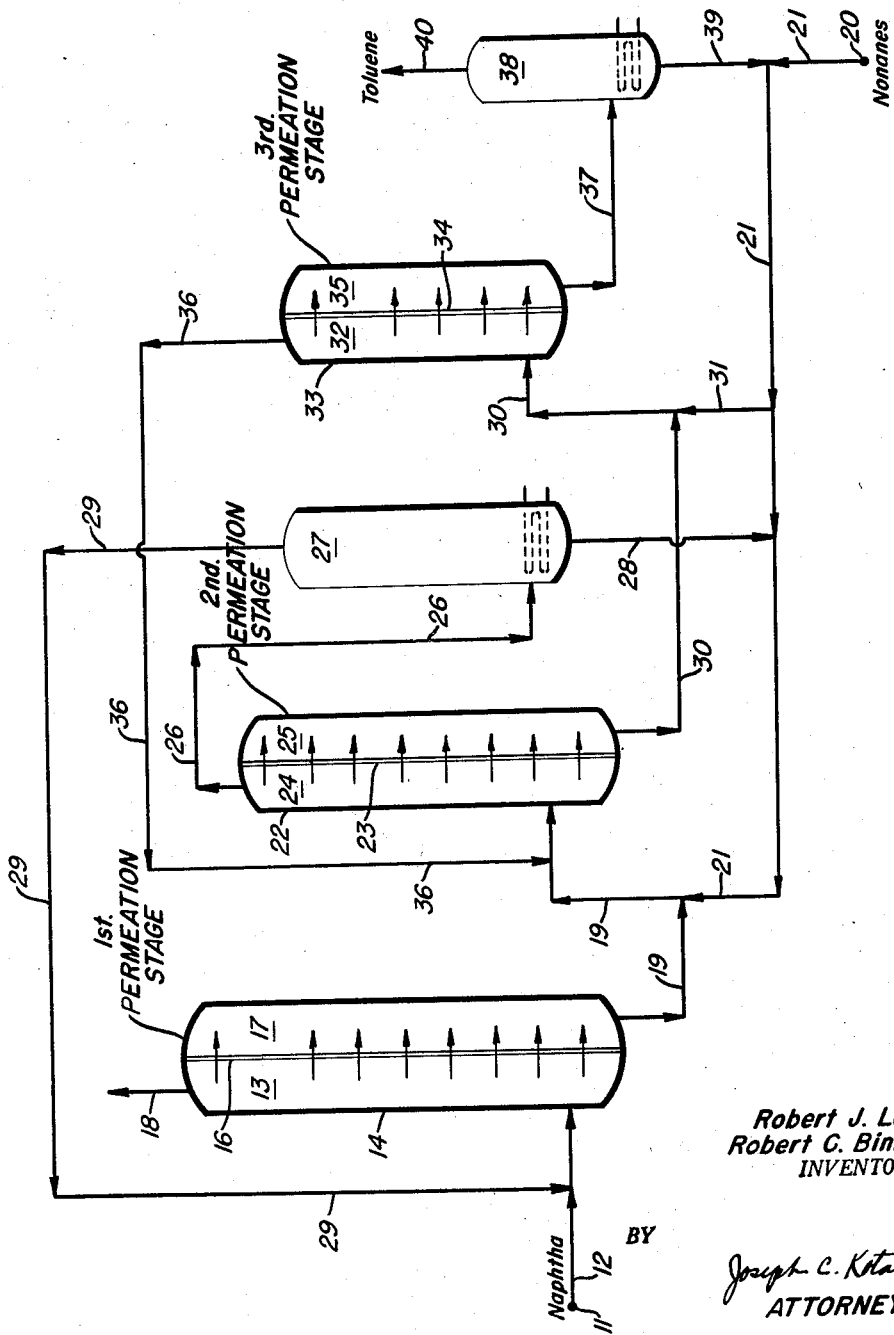

2,923,749

PREVENTION OF MEMBRANE RUPTURE IN A SEPARATORY PROCESS FOR OIL SOLUBLE ORGANIC COMPOUNDS USING A NON-POROUS PLASTIC PERMEATION MEMBRANE

Robert J. Lee, La Marque, and Robert C. Binning, Texas City, Tex., assignors to The American Oil Company, Texas City, Tex., a corporation of Texas Application May 27, 1955, Serial No. 511,662

5 Claims. (Cl. 260—674)

This invention relates to the separation of organic compounds. In particular it concerns an improvement in the process of separating organic compounds by selective permeation through non-porous plastic membranes.

While it is possible to separate the components of mixtures of oil-soluble organic compounds by selective permeation through non-porous plastic membranes, an exceedingly difficult problem frequently arises. The membrane employed, which affects the selectivity of the separation and the rate of permeation, is often ruptured. The permeation process is operated by contacting the feed mixture in the liquid phase with one side of the membrane and permeating a portion of the feed through the membrane. A permeated and a non-permeated fraction are separately recovered. It is readily apparent that if the membrane ruptures, then the feed, permeated fraction, and non-permeated fraction become mixed together. No separation of the components will be effected in that particular permeation stage and in fact the entire process may become disrupted. It is necessary to place that particular permeation stage off stream and then replace the ruptured membrane. A method whereby membrane ruptures could be avoided or reduced to a minimum would be highly desirable in rendering the permeation process more attractive commercially.

An object of this invention is to provide an improved method and means for separating mixtures of oil-soluble organic compounds. Another object is to provide a method and means for separating oil-soluble organic compounds by selective permeation through non-porous plastic membranes wherein rupturing of the membrane is avoided. A further object is to provide a method and means whereby the components of the mixture employed as feed to the permeation process can be recovered in a highly concentrated form. An additional object is to provide an improved permeation process for separating mixtures of oil-soluble organic compounds wherein a feed mixture highly concentrated in the component which permeates the membrane more rapidly may be employed without causing the membrane to rupture. Other objects will become apparent from the more detailed description of the invention.

It has been discovered that the membrane is often caused to rupture by raising the temperature at which the permeation process is being conducted and/or increasing the concentration in the feed mixture of the component thereof which permeates the membrane more rapidly. The membrane appears to become softened and then ruptures. We have found that this type of rupturing of the membrance can be prevented under conditions where it would normally occur if a certain amount of a saturated hydrocarbon is added to the feed mixture undergoing separation. The saturated hydrocarbon is miscible with the feed undergoing separation and dilutes it. About 0.1 to 20 volumes of saturated hydrocarbon may be added per volume of organic compound mixture although greater or lesser quantities may be employed under some circumstances. The saturated hydrocarbon is one separable by distillation from the components of the mixture or organic compounds undergoing separation. A portion of the liquid admixture of saturated hydrocarbon diluent and organic compound mixture is permeated through the membrane. The permeated fraction is then distilled to separate the saturated hydrocarbon diluent from the remaining portion of the permeated fraction. The diluent may be recycled for further use and the remaining portion of the permeated fraction is recovered. It is enriched in that component of the original mixture which was most soluble in and permeated the membrane most rapidly.

Our invention is useful in the separation of mixtures of oil-soluble organic compounds which have different degrees of solubility in the membrane used. Generally our invention cannot be practiced using water-soluble organic compounds unless these compounds are also miscible or soluble with oil.

The mixture may consist of two or more substituted hydrocarbons. By this we mean a hydrocarbon containing an element such as oxygen, sulfur, nitrogen, phosphorus, fluorine, chlorine, bromine, iodine, etc. For example, it may be a mixture of methyl ethyl ketone with n-butyl alcohol, iso-propyl alcohol and n-butyl mercaptan, diethyl sulfide and beta, beta'-dichlorodiethylether, pyridine and diethyl phosphite, butyl sulfone and butyl mercaptan, nitrobenzene and butylamine, ethylene diamine and ethylthiocyanate, ethylene dichloride and ethylene dibromide, dichloroethylene and trichloroethylene, butyl chloride and fluorobenzene, cyclohexanone and ethyl acetate, butyric acid and amyl acetate. It is apparent that mixtures of many other substituted hydrocarbons which are oil-soluble can be separated.

A mixture of a substituted hydrocarbon with a hydrocarbon also may be separated. For example, a mixture of a substituted hydrocarbon such as have been described supra with an aromatic, aliphatic, or alicyclic hydrocarbon can be separated into the individual components. The hydrocarbon components of the feed mixture will usually permeate the membrane more slowly than the substituted hydrocarbon components, hence the substituted hydrocarbon components will generally be contained in the permeated fraction in a higher concentration than they were present in the feed while the hydrocarbons will be contained in the non-permeated fraction in a higher concentration than they were present in the feed. For example, feed mixtures such as methyl butyl ketone and heptane, amyl acetate and methylcyclopentane, cyclohexanone and iso-octane, n-butanol and isobutylene, propyl mercaptan and n-hexane, diethylsulfide and cyclohexane, aceta-nitrile and dimethyl heptane, butyl amine and n-heptane, diethylsulfide and butadiene, ethylenedichloride and toluene, trichloroethylene and dimethylcyclopentane may be employed as feed mixtures.

A mixture of aromatic hydrocarbons with non-aromatic hydrocarbons or a mixture of unsaturated hydrocarbons with saturated hydrocarbons may be used as the feed mixture. Our invention is especially useful in the separation of liquid aromatic hydrocarbons such as benzene, toluene, ethylbenzene, xylene, mesitylene, durene, isodurene, other alkylated benzenes, naphthalene, dimethylnaphthalene, other alkylated naphthalenes, etc., from mixtures thereof with liquid non-aromatic hydrocarbons of aliphatic or alicyclic nature either saturated or unsaturated. The aromatic hydrocarbon component of the mixture permeates the membrane more rapidly than the non-aromatic hydrocarbon component. It is present in the permeate in a concentration higher than in the feed. The non-aromatic component is present in the non-permeated fraction in a higher concentration than in the feed. Unsaturated hydrocarbons permeate less rapidly than aromatic hydrocarbons while the saturated hydrocarbons permeate even more slowly. The mixture of aromatic with non-aromatic hydrocarbons or the mixture of unsaturated with saturated hydrocarbons may consist of two or more components. Natural or synthetic mixtures of such hydrocarbons may be separated. For example, mixtures of aromatic and non-aromatic hydrocarbons produced during the hydrogenation of coal, during the coking of coal, or in other methods of synthesis may be used as the feed mixture to be separated. Petroleum fractions especially close-boiling fractions, viz., those boiling within a range of 25° C. or less, are a preferred feed mixture for the separation and recovery of the aromatic hydrocarbons contained therein. A virgin distillate or one produced during various refining operations such as cracking, hydroforming, hydrogenation, etc., may be employed as the feed to be separated. For instance, benzene, toluene, xylene, trimethylbenzene, etc., can be separated from close-boiling fractions of naphthat which are produced during hydroforming or catalytic cracking operations. Thus benzene can be separated from a close boiling mixture (which boils between about 60° and 90° C.) with other hydrocarbons, and which mixture contains more than about 30 volume percent benzene. Dimethylnaphthalene can be separated from the cycle oil which is produced during the catalytic cracking of gas oil.

The permeation process is highly useful in separating close-boiling mixtures, viz., those boiling within a range of less than 25° C. It is especially useful in separating mixtures which cannot be separated by distillation either because the boiling points of the components are too close together or because constant boiling mixtures viz., azeotropic mixtures are formed.

The permeation step is conducted by contacting the feed mixture of oil-soluble organic compounds while in the liquid phase with one side (feed side) of a thin non-porous plastic membrane in which one of the components of the feed mixture is more soluble than the other components. A portion of the feed mixture is permeated through the membrane. A permeated and a non-permeated fraction are then separately recovered. Their compositions differ from each other and from the mixtures employed as feed. The permeated fraction is enriched in the components of the feed mixture which is more soluble in the membrane. The non-permeated fraction will be depleted in this component and enriched in the component of the original mixture which is less soluble in the membrane.

In order for permeation to occur there must be a concentration gradient between the feed zone and the permeate zone (wherefrom the permeated fraction is recovered). A higher concentration of the component which preferably permeates the membrane (is more soluble in the membrane) must be present in the feed zone and a lower concentration of this same component must be present in the permeate zone. Under these conditions a portion of the feed mixture will dissolve within the membrane and permeate therethrough. To facilitate rapid permeation the concentration of permeated components at the surface of the membrane on the permeate side may be kept low by rapid removal of the permeated fraction or dilution thereof with a diluent liquid or gas. It is preferred to remove the permeated components in the vapor phase from the permeate side of the membrane. The process of this invention is useful when the feed mixture in contact with the membrane is in the liquid phase, rather than in the vapor phase, for under vapor phase conditions the membrane is not likely to rupture. Operation with the feed in the liquid phase is much preferred since permeation rates as much as 50% higher are thereby obtained.

The feed mixture may be continuously or intermittently introduced into the feed zone. The permeated fraction thereof is removed from the opposite side of the membrane and preferably rapidly removed from the permeate zone. The non-permeated fraction may be continuously or intermittently removed. The rate of introduction of the feed and the removal of the non-permeated fraction may be adjusted to provide the desired proportion of permeated and non-permeated fractions. In order to obtain some concentration of the components of the feed mixture it is, of course, essential that only a portion of the feed be permeated. The amount permeated may vary greatly dependent to a considerable extent upon the concentration of the components present in the feed mixture, and the selectivity and composition of the membrane. Lesser amounts are permeated when the preferentially permeatable component is present in the feed in a low concentration, especially when the selectivity of the membrane for such component is high. From as little as 2% to as much as 95% of the feed mixture may be permeated per permeation stage. Often the permeation of about 50% of the feed per permeation stage is satisfactory. A number of permeation stages may be used. Permeated and non-permeated fractions may be recycled to the various stages when the concentration of the components therein is suitable. In each permeation zone the membrane may be used in the form of sheets, tubes, or other structures which preferably provide a maximum amount of membrane surface while using a minimum volume of space.

The absolute pressures in the feed and permeate zones may vary from sub-atmospheric to super-atmospheric. Pressure differentials of from 10 mm. Hg to as high as 500 or 1000 p.s.i.g. or higher may be used, depending upon the strength of the membrane, the supporting means therefor, etc. It is usually preferred to operate the permeate zone at sub-atmospheric pressures and the feed zone at atmospheric or super-atmospheric pressures up to about 100 p.s.i.g. or higher. By employing a sub-atmospheric pressure in the permeate zone, the permeated fraction is easily evaporated from the permeate side of the membrane and removed from the permeate zone in the vapor state.

In general the permeation process is preferably operated at as high a temperature as is possible. The higher operating temperatures result in increased rates of permeation. A wide range of temperatures from about 0° C. to about 250° C., depending upon the composition of the membrane used and the composition of the feed mixture of oil soluble organic compounds, may be used.

The membrane which is employed is non-porous, i.e. it is free from holes, tears, etc., which destroy the continuity of the membrane surface. It must not contain pores because if the feed were to leak therethrough, the selectivity of the permeation step would be destroyed. The membrance which is employed is of a plastic type material. It is not composed of porous or sintered metal, ceramic materials, porous glass or the like. Materials of the latter type are used in mass diffusion for the separation of gases wherein advantage is taken of the phenomenon that different gases diffuse through a porous medium at rates which vary inversely with the square root of their density or molecular weight. The membrane should be as thin as possible and yet retain sufficient strength and stability to be useful in the permeation process. It may vary from 0.01 to 10 mils or somewhat more. Higher rates of permeation are obtained with the thinner membranes. Supports such as fine mesh wire screen, porous sintered metals, or ceramic materials may be used as backing or supporting means for the membrane to minimize the possibility of the membrane rupturing. Permeation through non-porous plastic membranes has been described in the prior art in U.S. 2,540,151 to S. W. Weller et al. and U.S. 2,475,990 to A. E. Robertson.

The membrane employed in the permeation step is comprised of a material such as is commonly useful in separating oil soluble organic compounds by selective permeation. They are materials in which different oil soluble organic compounds are soluble in differing amounts. Examples of such materials are shown in U.S. 2,475,990 to A. E. Robertson, which lists natural or synthetic rubber, vulcanized natural rubber, Ebonite, neoprene, polybutadiene, copolymers of butadiene with styrene, butadiene-acrylonitrile copolymers and various other polymeric materials.

Cellulose derivatives such as cellulose ethers and cellulose esters may be used as the membrane material. Cellulose ethers such as ethyl-, propyl-, butyl-, amyl-, methyl ethyl-, ethyl butyl-, propyl butyl-cellulose and other cellulose ethers may be used. Ethyl cellulose having an ethoxyl content of about 40 to 50% by weight is highly useful as a membrane material because of its high rate of permeation. Membranes comprised of cellulose esters, such as cellulose acetate-propionate, cellulose acetate-butyrate, cellulose acetate-pentanoate, cellulose butyrate, cellulose benzoate, cellulose acetate-benzoate and other esters are very useful because such membranes display a high selectivity for one component of a mixture of oil soluble organic compounds in preference to the other components. The preferred celluose ester material is cellulose acetate-butyrate having an acetyl content of about 1 to 15% by weight and butyryl content of 35 to 56% by weight. This invention is especially useful when using a cellulose acetate butyrate membrane having an acetyl content of 5 to 10% by weight and a butyryl content of 40 to 50% by weight to separate aromatic hydrocarbons from a hydrocarbon mixture having a high concentration of aromatic hydrocarbons. The membranes may consist of mixtures of cellulose ethers and cellulose esters or mixtures of various other plastic materials. It is to be understood that membrane composed of many different materials can be used even though the rates of permeation and the selectivities of the different membranes may vary in the extreme.

The diluent which is added to the liquid mixture of organic compounds undergoing separation in a saturated hydrocarbon which is separable by distillation from the components of the mixture or organic compounds. Other hydrocarbons are not satisfactory for this purpose nor are other oil soluble organic compounds. The saturated hydrocarbon may be aliphatic or alicyclic, e.g. straight chain or branched chain paraffins, cycloparaffins or alkylcycloparaffins. Straight chain paraffins are preferred. For example, the different pentanes, hexanes, heptanes, octanes, nonanes, decanes, undecanes, dodecanes, etc. and mixtures thereof may be used as diluents. The diluent may consist of a synthetic or natural mixture of hydrocarbons, e.g. petroleum distillates consisting substantially of saturated hydrocarbons such as fractions of virgin naphtha of a suitable boiling range. The diluent may boil higher or lower than the components of the mixture which is undergoing separation. When only a low ratio of diluent to feed mixture (as used herein the term "feed mixture" is to be understood to mean the mixture of oil soluble organic compounds without added diluent) is being used then the diluent is preferably lower boiling than the components of the feed mixture. When a high ratio of diluent to feed mixture is used, then the diluent is preferably higher boiling than the components of the feed mixture. About 0.1 to 20 volumes of diluent per volume of feed mixture may be used although lower or higher ratios may be employed. The most economical ratios to use can be determined by simple physical tests which are described later. The diluent should be added to the feed mixture in an amount sufficient to prevent softening and rupture of the membrane under conditions where the membrane would normally rupture if the diluent were not added.

In attempting to improve permeation rates by increasing the temperature of the permeation step, it has been found that when the temperature is increased above a certain figure, the liquid feed mixture seems to soften and solubilize the membrane, causing it to rupture. This solvation effect reduces the tensile strength of the membrane and causes some dissolution of the membrane, resulting in its rupture. This type of rupturing is distinctly different from the usual type of rupture wherein the tensile strength is not reduced to any noticeable extent, but physical forces cause the tensile strength to be exceeded. This type of rupturing is also caused when the concentration in the liquid feed of the component thereof which is more soluble in the membrane, is increased in excess of a certain level. The temperature and the concentration of the more soluble feed component which may safely be used differs with various membrane compositions, but is easily predetermined by simple tests. The effect of the factors of permeation temperature and concentration of the components of the feed mixture is shown in the following series of tests. These sample tests were performed by immersing a sample of the particular membrane to be used in a beaker containing the liquid feed mixture to be permeated. The temperature of the feed mixture was gradually raised and when the sample membrane seemed to swell and soften, the temperature was noted. At a temperature above that noted, the membrane would rupture in the permeation step. The same procedure was repeated using a feed mixture having concentrations ranging from 0 to 100% of the various components. Example tests with various membranes using feed mixtures of toluene with n-heptane and dimethyl naphthalene with n-heptane are as follows:

| Series | Membrane | Temp., °C. | Condition of Membrane Feed: Toluene and n-Heptane; Vol. Percent Toluene | | | | | | | | | | |
|---|---|---|---|---|---|---|---|---|---|---|---|---|---|
| | | | 0 | 10 | 20 | 30 | 40 | 50 | 60 | 70 | 80 | 90 | 100 |
| I | Ethyl cellulose (Hercules Ethocel N-100, ethoxyl content of 45% by wt.) | 24 | S | S | S | S | R | | | | | | |
| | | 40 | S | S | S | R | | | | | | | |
| | | 70 | S | R | R | | | | | | | | |
| II | Cellulose acetate-butyrate (Acetyl content of 6.0% and butyryl content of 46.7% by wt.) | 23 | S | S | S | S | S | S | S | S | S | R | |
| | | 48 | S | S | S | S | S | S | S | R | R | | |
| | | 70 | S | S | S | S | S | R | R | | | | |
| | | 90 | S | S | S | R | R | | | | | | |
| III | Cellulose tributyrate (Acetyl content of 1.4% and butyryl content of 55.8% by wt.) | 25 | S | S | S | S | S | S | S | S | S | S | S |
| | | 50 | S | S | S | S | S | S | S | S | S | S | R |
| | | 70 | S | S | S | S | S | S | S | S | S | R | |
| | | 90 | S | S | S | S | S | S | S | S | R | | |
| IV | Cellulose acetate butyrate (Acetyl content of 13% and butyryl content of 38% by wt.) | 25 | S | S | S | S | S | S | S | S | S | S | S |
| | | 50 | S | S | S | S | S | S | S | S | S | S | R |
| | | 70 | S | S | S | S | S | S | S | S | S | S | R |
| | | 90 | S | S | S | S | S | S | S | S | S | R | |

| Series | Membrane | Temp., °C. | Feed: Dimethylnaphthalene and n-Heptane | | | | | | | | | | |
|---|---|---|---|---|---|---|---|---|---|---|---|---|---|
| | | | 0 | 10 | 20 | 30 | 40 | 50 | 60 | 70 | 80 | 90 | 100 |
| V | Cellulose acetate butyrate (Acetyl content of 13% and butyryl content of 38% by wt.) | 25 | S | S | S | S | S | S | S | S | S | S | S |
| | | 50 | S | S | S | S | S | S | S | S | S | S | R |
| | | 70 | S | S | S | S | S | S | S | S | R | R | |
| | | 90 | S | S | S | S | S | S | S | R | R | | |

S—satisfactory.   R—rupture.

The importance of temperature and concentration of the components of the feed mixture more soluble in the membrane is apparent from the above tests. For example, Series 1 shows that at any toluene concentration higher than about 30% by volume, the membrane would rupture if a permeation temperature of 24° C. or higher were used. Likewise, if a temperature of 40° C. were maintained in the permeation step, then the concentration of toluene in the liquid feed in contact with the membrane could not be allowed to exceed about 20% by volume or rupture would occur. From simple tests of the type described above it is possible to determine the maximum temperature and concentration of the feed component more soluble in the membrane which may be employed without causing the membrane to rupture. By employing this invention it is now possible to operate at higher temperatures and concentrations i.e. at those temperatures and concentrations which would normally cause the membrane to rupture. Mixtures of oil-soluble organic compounds can thus be separated at higher permeation rates (because of the higher permeation temperatures which can be used). It is now also possible to employ a feed mixture having a very high concentration of the component more soluble in the membrane and by using such mixture the more soluble component can be recovered in the permeate in essentially pure form.

An experimental permeation step was performed. In brief the permeation apparatus consisted of a feed chamber for the feed mixture; a membrane holder of box-like shape having five open faces across which the membrane was sealed, the sixth face having sealed thereto a line for removing the permeated fraction from the interior (permeate zone) of the membrane holder; and associated pumps, pressure regulating and measuring devices, and temperature controllers for controlling the temperature and pressure in the feed and permeate zones at those conditions desired. The apparatus provided a total membrane surface of 22 square inches.

A 500 ml. mixture of benzene and 2,4-dimethylpentane containing 5.2 volume percent benzene was placed in the fed chamber of the permeation apparatus. Then a temperature of about 68° C. was maintained in the apparatus. The feed chamber was maintained at atmospheric pressure and an absolute pressure of 360 mm. Hg was maintained in the permeate zone. A cellulose acetate butyrate membrane having an acetyl content of 7% by weight and a butyryl content of 48% by weight and having a thickness of 1.5 mils was used. The permeation step was conducted for about two hours and the permeate produced at a rate of about 2.1 gals./hr./1000 sq. ft. of membrane surface. The permeate was analyzed and found to contain 52 volume percent of benzene. Under these conditions the membrane thus displays a separation factor ($\gamma$) for benzene of 22.0. It would not be possible to produce more concentrated benzene by using the permeate as the feed mixture to a subsequent permeation stage at the temperature employed in the first stage since to do so would cause the membrane to rupture. However, if the permeate were diluted with about an equal volume of n-octane, then it would be possible to permeate such a diluted liquid mixture through a second stage permeation at about 70° C. without causing the membrane to rupture. Highly concentrated benzene would be contained in the permeate from this second permeation stage. The process could be repeated in a third stage if additional diluent were added to the feed mixture employed.

The invention will be more clearly understood by reference to the following specific example illustrated in the annexed drawing which forms a part of this specification and shows in schematic form one embodiment of the process of this invention for separating a close-boiling mixture of aromatic and non-aromatic hydrocarbons.

The mixture of organic compounds which is separated in this illustration is a petroleum naphtha boiling between about 90° and 120° C. It contains about 5 volume percent of toluene, the remainder being saturated hydrocarbons having for the most part 7 or 8 carbon atoms. The naphtha is passed from source 11 at a temperature of about 100° C. by way of line 12 into the feed zone 13 of the first permeation stage. As illustrated diagrammatically herein the first permeation stage consists of a vessel 14 which is divided by a non-porous plastic membrane 16 to form two vertical sections, one being the feed zone 13 and the other being the permeate zone 17. The non-porous plastic membrane which is employed in each of the three stages of the embodiment described is comprised of cellulose acetate-butyrate having an acetyl content of about 6% and a butyryl content of about 47%. The thickness of the membrane used is about 0.5 mil. Although not illustrated herein, each permeation stage may consist of a number of individual units which operate in parallel on the feed mixture, the permeate from each unit being blended and passed to the next permeation stage. The feed zone of each permeation stage is maintained at about atmospheric pressure whereas the pressure in the permeate zone is maintained at about 100 mm. Hg abs. Under these conditions the hydrocarbons in the feed zone are in the liquid phase and the hydrocarbons removed from the permeate side of the membrane are in the vapor phase. To ensure clarity, the numerous pumps, condensers, and other equipment necessary to maintain the stated conditions of temperature and pressure are not detailed herein.

A minor portion e.g. about 10% of the naphtha charged is permeated through the membrane 16 in the first stage. The non-permeated fraction is withdrawn from feed zone 13 by way of line 18 and passed to storage, not shown. If it is desired to insure substantially complete removal of the toluene, then this non-permeated fraction may be employed as charge to a permeation stage for the recovery of a permeate fraction which may be processed for the toluene contained therein. The vapors of permeated hydrocarbons are withdrawn from permeate zone 17 by way of line 19. The vapors are compressed and liquefied. The concentration of toluenes in this permeate fraction is in the neighborhood of about 50%. About three to four volumes of a paraffinic naphtha, boiling between about 130° and 150° C. and consisting essentially of nonanes which are substantially free of aromatics and unsaturated hydrocarbons is passed from source 20 by way of line 21 into line 19. The concentration of toluene in the hydrocarbon mixture is thus diluted to about 10 to 15 volume percent. The feed to each subsequent permeation stage is similarly diluted with the nonane fraction so that the concentration of toluene is also about 10 to 15 volume percent. The portion of the feed which is permeated through the membrane in subsequent permeation stages is about 10 to 20% of the admixture charged to the feed zone.

The second permeation stage is represented by a vessel 22 having the membrane 23 separating a feed zone 24 from a permeate zone 25. The liquid admixture of nonanes with the permeate from the first stage is passed by way of line 19 into feed zone 24 of the second permeation stage. The non-permeated fraction is removed from feed zone 24 and passed by way of line 26 into fractionator 27. A bottoms fraction of nonanes is removed from fractionator 27 and passed by way of line 28 into line 21 for admixture with the feed to the second permeation stage. An overhead stream is removed from fractionator 27 condensed and passed by way of line 29 into line 12 for the recovery of remaining amounts of toluene.

The permeated fraction from the second permeation stage is withdrawn from permeate zone 25 by way of line 30 and is liquefied by compression. Nonanes are admixed with the liquid feed by introducing the nonanes from source 20 by way of line 21 and thence by way of line 31 into line 30. The admixture of the second stage permeate and nonanes are introduced by way of line 24 into feed zone 32 of the third permeation stage.

The third permeation stage is represented herein by a vessel having the membrane 34 separating feed zone 32 from permeate zone 35. The liquid non-permeated fraction is removed from feed zone 32 by way of line 36 and then passed into line 19 whereby it is carried into feed zone 24 of the second permeation stage for the recovery of further amounts of toluene present in this non-permeated fraction. The permeated fraction from the third stage is removed from permeate zone 35 by way of line 37 and thence passed into fractionator 38. A liquid bottoms stream of nonanes is removed by way of line 39 and passed into line 21 for recycling as diluent to the various permeation stages. An overhead stream consisting almost entirely of toluene is removed from fractionator 38 by way of line 40 and passed to storage, not shown.

Thus having described the invention, what is claimed is:

1. In a permeation process for the separation of a mixture of oil soluble organic chemicals which mixture contains an excessively high concentration of the more permeable component such that contact of the liquid mixture of organic chemicals with a non-porous plastic permeation membrane would cause the membrane to rupture during permeation due to said excessively high concentration, the improvement which comprises reducing the concentration of said more permeable component to a level at which it does not cause rupturing of the membrane during permeation by the step of diluting said liquid mixture of oil soluble organic chemicals with a saturated hydrocarbon miscible therewith, said saturated hydrocarbon being separable from the original components of the mixture by distillation.

2. The method of claim 1 wherein the mixture of oil soluble organic chemicals to be separated is a mixture of aromatic and non-aromatic hydrocarbons.

3. The process of claim 1 wherein the mixture undergoing separation boils within a range of less than about 25° C.

4. The process of claim 1 wherein the mixture undergoing separation boils within the gasoline boiling range.

5. The process of claim 1 wherein said saturated hydrocarbon is added to the said mixture undergoing permeation in an amount of about 0.1 to 20 volumes per volume of said mixture.

References Cited in the file of this patent

UNITED STATES PATENTS

| | | |
|---|---|---|
| 2,159,434 | Frey | May 23, 1939 |
| 2,475,990 | Robertson | July 12, 1949 |
| 2,675,349 | Saroff et al. | Apr. 13, 1954 |